3,305,267
PROCESS AND APPARATUS FOR WINNING
AND TRANSPORTING MATERIALS
Izaak S. Van Dommelen, Hoensbroek, Netherlands, assignor to Stamicarbon N. V., Heerlen, Netherlands
Filed May 20, 1964, Ser. No. 368,847
Claims priority, application Netherlands, May 22, 1963,
293,161
13 Claims. (Cl. 299—1)

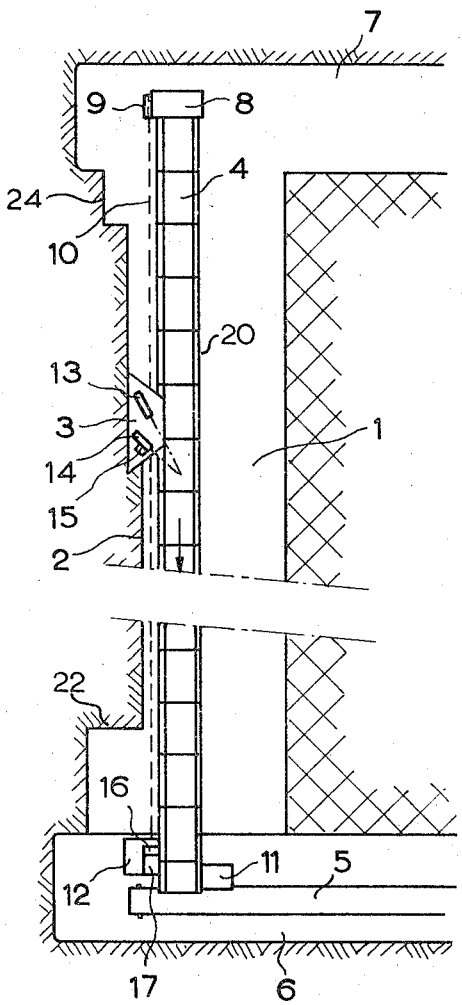

The present invention relates to a process and apparatus for winning or severing material such as coal or the like from large bodies of said material, such as mineral seams, utilizing a mineral seam face traversing mining machine including at least one cutting head arranged to sever material from the face and load the severed material laterally of the face onto a moving endless conveyor paralleling the path of the cutting head. The conveyor usually operates at a substantially constant velocity and delivers the severed material to a collecting point. In many cases a plurality of spaced like cutting heads may successively, reversingly traverse the mineral face and so load the same conveyor.

In the mining operation with which the present invention is most particularly concerned, each plow-like cutting head is propelled substantially continuously between the ends of the mineral face or seam, reversing in traversing direction each time an end of the face or seam is reached. Accordingly, during one portion of its operation the cutting head is traversing the seam or face codirectionally with the conveyor to which it is transferring the severed material, and during alternate portions of its operation the cutting head is traversing the seam or face oppositely to the conveyor transport direction. If the cutting depth of the cutting head is substantially equal during each successive cut and the cutting head traversing speed is maintained substantially constant, it can be seen that more severed material would be loaded onto the conveyor during the codirectional traverse than the oppositely directed traverse inasmuch as in the former instance the relative velocity of the conveyor with respect to the cutting head is much smaller.

An important consideration in the utilization of mining equipment of the variety discussed is to maximize the amount of material being severed and conveyed without overloading any elements of the system. It can thus be seen that the problem of having less than a maximum amount of severed material on the conveyor during the cutting head's oppositely directed traverse could be alleviated somewhat, at least within the mechanical limitations of the system, by increasing the cutting head cutting depth during each non-codirectional traverse by any amount calculable from the difference in relative velocities of the cutting head and conveyor during the two portions of the cycle just discussed. However, in instances where the change in relative velocity is substantial the cutting depth cannot be increased sufficiently to provide the desired compensation because of the greatly increased stress that would be placed on the cutting head during its deeper cutting traverse which could produce early mechanical failure thereof, as well as the uneconomic wastage of the cutting capacity such a cutting head must have for its deeper cutting traverse during its shallower cutting traverse.

The solution to the last mentioned problem has been found to reside, in part, in combining a smaller increase in the cutting depth during the non-codirectional traverse with a change in the traversing speed of the cutting head during said portion of the cycle.

A heretofore unsatisfactorily solved problem also incumbent in maximizing the amount of material severed and transported in the variety of mining operation discussed hereinbefore, is that in many instances material severed from the mineral seam or face does not always immediately fall into the path of the plow-like portion of the cutting head for transverse displacement onto the conveyor.

Accordingly, short duration peaks and troughs occur in the absolute value of the load carried by the conveyor at points along its length.

This delayed-fall problem has in the past necessitated the accepting of substantially lower average material transport load, a percentage of the theoretical maximum output of the system, in order to prevent mechanical failure inducing short duration overloading of the conveyor and subsequent transport portions of the mining system and also spillage therefrom caused when delayed fall severed material landed on severed material already on the conveyor which had been cut subsequently by the cutting head or by others of the cutting heads where a plurality of such heads are employed.

It is therefore an important object of the present invention to substantially increase the practicable load factor of such mining systems while also effectively, substantially reducing the likelihood of overloading of the transport conveyor portion thereof.

It is a more specific object of the invention to provide a method and apparatus for sensing the amount of severed material already on a moving material transport conveyor at a point thereon adjacent a mineral face or seam traversing cutting head, and controlling the traversing speed of said cutting head in response to the load already on the conveyor to effectively prevent a local overloading of the conveyor.

Still another object of the invention is the provision of a method and apparatus of the type described wherein the amount of severed material conveyed is effectively maximized by varying the seam face traversing speed of a moving cutting head in response to a continuous sensing of the amount of severed material already on the conveyor at a point on the conveyor or spaced forwardly of the cutting head in the direction of its traverse.

Another object of the invention is to provide a method and apparatus in a mining system of the type described wherein during the codirectional traverse of the cutting head, the traversing speed thereof is controlled in dependence on the amount of material already on the conveyor at the point thereon where material now being severed will land, said dependence being effectuated by the sensing of at least the exceeding of a predetermined height of material on the conveyor at said point, and optionally of the absolute height of the material on the conveyor at said point.

These and other objects of the invention as well as the principles thereof will be more clearly understood with reference to the following detailed explanation of a preferred embodiment of the invention, reference being made to the attached drawing wherein the said embodiment is illustrated.

In the drawing:

The figure is a generally schematic top plan view of a mine gallery wherein apparatus embodying the principles of the invention is illustrated adjacent a mineral face or seam of the mine.

More particularly, the mining apparatus 20 is arranged along the mineral face 2 in the gallery 1 so that the cutting head 3 is reciprocable between the ends 22, 24 of the face 2. As shown the cutting head 3 is configured to both sever material from the face 2 and move it laterally outwardly of the face onto a moving endless conveyor 4. The conveyor transfers the severed material to a moving belt 5 in the roadway 6 at the delivery end 22 of the face. The conveyor 4 extends between a generally horizontally directed idler pulley or reversing station 8 in the roadway 7 at the end 24 of the face and a similar reversing station at the delivery end 22 of the face including conveyor drive means 11 adapted to drive the conveyor 4 continuously in one direction at a substantially constant speed.

A rotatable reversing station 9, for instance in the form of an idler sprocket preferably colocated with the station 8 but rotatable independently thereof, is provided for positioning the endless drive chain 10 of the cutting head 3. Similarly drive means such as a hydraulic motor 12 for drivingly engaging the drive chain 10 is preferably located adjacent the drive means 11 of the conveyor 4. However, according to the invention the cutting head drive chain drive motor is preferably reversibly coupled to the chain 10 so that the traversing direction of the cutting head 3 can be reversed as it reaches an end 22 or 24 of the mineral face. The reversing sequence can be manually or automatically effected by means such as a hydraulic valve control box 17 adjacent the hydraulic motor 12.

In order to provide the sensing means discussed hereinabove as the principal improvement provided by the present invention, the cutting head 3 is equipped with a signal transmitting device 13 shown aimed forwardly of the cutting head's codirectional traverse direction and toward the conveyor 4 so as to direct signals from the device 13 at the severed material on the conveyor at the point thereon where material just about to be severed from the face 2 will land.

In a first form of the invention wherein the transmitter 13 is arranged to cooperate in providing an indication if a predetermined height of material has been exceeded, the transmitted signal does not have a substantial vertical height at the point where it intersects the path of the severed material on the conveyor. The signals from the transmitter 13, if reflected by material on the conveyor 4 are received by a detector 14 also mounted on the cutting head 3. The detected signals are transmitted by a suitable transmitter 15, colocated with the detector 14, to a command receiver 16 which is adapted to control the drive speed of the motor 12. The signals passing from the transmitter 15 to the receiver 16 may conveniently utilize the conveyor itself as a transmission medium.

Accordingly, when signals are reflected by material on the conveyor exceeding the predetermined height, the cutting head speed is slowed, in its codirectional traverse, until signals are no longer reflected, whereupon the receiver 16 re-establishes the higher speed.

In a more comprehensive system according to the invention the transmitter 13 emits a vertically broad beam which intersects the path of severed material on the conveyor. The detector 14 includes a plurality of vertically spaced detector means such that the absolute height of material on the conveyor is determined and transmitted via the transmitter 15 to the command receiver 16. Accordingly the receiver 16 operating upon the motor control 17 retards and advances the traversing speed of the cutting head 3 in order to maintain a practically optimized level of severed material on the conveyor 4.

It should be recognized that whereas the drive chain drive means has been particularly exemplified as a hydraulic motor, inasmuch as this type of system has been found to be more flexible and portable, however in some instances it might advantageously be replaced by for instance, an electric motor and the control 17 by a Ward-Leonard type controller.

The signal systems 13, 14 and 15, 16 may employ like or diverse signals and may partake of electric, mechanical, electro-mechanical or electronic character. For instance, solenoid operating mechanical feelers, electrohydraulic relays, ultrasonic wave generators and receivers, and photoelectric cell means have been found to be successfully useable in the system provided by the present invention.

It should also be apparent that means may be provided within the purview of the invention to automatically angularly reposition the transmitter and detector 13, 14 in correspondence to the speed and direction of traverse of the cutting head 3, so that the point on the conveyor path which is being monitored accurately corresponds to the point thereon where material about to be severed from the face 2 will land. Of course, it is contemplated that if the transmitter-detector system 13, 14 is arranged to monitor a point on the conveyor more forwardly of the cutting head travel than where the immediately to be severed material will land that a time delay could be included in the transmitter-detector-controller system 15, 16, 17 to compensate therefor.

As an example, during the codirectional traverse of the cutting head 3, at a speed of about 0.5 meter per second, cutting and loading coal onto the conveyor 4 traveling at a constant speed of 1.0 meter per second an optimum monitoring point has been found to be 50 centimeters ahead of a moving imaginary vertical plane extending laterally from the mineral face and intersecting the leading edge of the cutting head.

The system described should now be comprehended as facilitating the effective accomplishment of all the objects of the invention set forth hereinbefore in a novel manner. Inasmuch as the particular embodiment described to illustrate the principles of the method and apparatus of the invention can be substantially modified without departing from these principles the invention should be understood as encompassing all modifications within the spirit and scope of the following claims.

I claim:

1. A method for mining material from the face of a seam of such material comprising: progressively severing a predetermined thickness of material from said seam; displacing said material generally laterally outwardly of said face onto a continuously transporting conveyor as said material is progressively severed, monitoring the level of material on the conveyor at a point thereon where the material about to be severed from said face will be placed, controlling the rate of displacement of severed material onto the conveyor at said point in response to the monitoring of the level at said point to optimize the amount of material being conveyed and prevent overloading of the conveyor.

2. A method as set forth in claim 1 wherein control of the rate of displacement of severed material onto the conveyor is effected by advancing and retarding the rate of the severing of said about to be severed material.

3. A method for mining material from the face of a seam of such material comprising: progressively traversingly severing a predetermined thickness of material from said seam; displacing said material generally laterally outwardly of said face onto a continuously transporting conveyor as said material is progressively severed, monitoring the level of material on the conveyor for the exceeding of a predetermined height of severed material on said conveyor at a point thereon where the material about to be severed from said face will be placed and, upon the sensing of the exceeding of said predetermined height, lowering the rate of displacement of severed material onto the conveyor until the level of material at the monitored point lies below said predetermined level.

4. Apparatus for mining material from the face of a seam of such material comprising a cutting head, means for propelling said cutting head along said face in cutting engagement therewith to progressively sever a predetermined thickness of material from said seam; a continuously transporting conveyor generally paralleling said face outwardly of said cutting head, means for displacing the progressively severed material onto the conveyor as it is severed and means including sensing means for continuously controlling the rate of displacement of severed material onto said conveyor in response to a sensing of the level of severed material already on said conveyor at the moving point thereon where material about to be severed will be placed.

5. Apparatus as set forth in claim 4 wherein the cutting head propelling means includes at least one hydraulic motor and endless drive means coupling said motor to said cutting head.

6. Apparatus as set forth in claim 4 wherein the cutting head propelling means includes means for varying the speed of movement of said cutting head along said seam; and said continuously controlling means includes means for communicating the sensing of said level to said propelling means whereby the speed of movement of said cutting head is correlated with said sensed level.

7. Apparatus as set forth in claim 6 wherein the propelling means moves the cutting head alternately between the ends of said face.

8. Apparatus as set forth in claim 7 wherein said sensing means is mounted for movement with the cutting head, includes a signal transmitter and a signal receiver adapted to receive said signals when reflected from the severed material on the conveyor at said moving point, and means for repositioning said transmitter and receiver upon changes in the speed and direction of movement of said cutter to maintain level sensing at said moving point.

9. Apparatus as set forth in claim 6 wherein said sensing means is mounted for movement with said cutting head.

10. Apparatus as set forth in claim 9 wherein the sensing means includes a signal transmitter and a signal receiver adapted to receive said signals when reflected from the severed material on the conveyor at said moving point.

11. Apparatus as set forth in claim 10 wherein the communication means comprises means for transmitting signals to said speed varying means in response to signals received by said receiver.

12. Apparatus as set forth in claim 11 wherein the signals transmitted to said speed varying means are received by a command receiver forming a part of said speed varying means.

13. Apparatus as set forth in claim 12 wherein the transmitter transmitting signals to said speed varying means command receiver employs the conveyor as a medium.

References Cited by the Examiner

UNITED STATES PATENTS 2,590,968   4/1952   Hill _____ 222—55 X

FOREIGN PATENTS 703,492   2/1954   Great Britain.
906,931   9/1962   Great Britain.

ERNEST R. PURSER, *Primary Examiner.*